United States Patent
Kinoshita et al.

(10) Patent No.: US 8,513,173 B2
(45) Date of Patent: Aug. 20, 2013

(54) LUBRICANT COMPOSITION FOR BALL JOINT AND BALL JOINT

(75) Inventors: Hirotsugu Kinoshita, Yokohama (JP); Takashi Arai, Gunma (JP); Kiyomi Sakamoto, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 13/226,307

(22) Filed: Sep. 6, 2011

(65) Prior Publication Data

US 2011/0318092 A1 Dec. 29, 2011

Related U.S. Application Data

(63) Continuation of application No. 11/757,976, filed on Jun. 4, 2007, now abandoned, which is a continuation of application No. 10/482,511, filed as application No. PCT/JP02/06884 on Jul. 8, 2002, now abandoned.

(30) Foreign Application Priority Data

Jul. 9, 2001 (JP) ................................. 2001-207722

(51) Int. Cl.
  *C10M 133/00* (2006.01)
  *C10M 133/16* (2006.01)
(52) U.S. Cl.
  USPC .......................................... 508/543; 508/558
(58) Field of Classification Search
  USPC ............................................... 508/558, 543
  See application file for complete search history.

(56) References Cited

U.S. PATENT DOCUMENTS

| 2,990,943 | A | * | 7/1961 | Turinsky | 72/42 |
| 4,371,446 | A | * | 2/1983 | Kinoshita et al. | 508/144 |
| 4,552,480 | A | * | 11/1985 | McIntyre | 403/76 |
| 4,849,119 | A | * | 7/1989 | Horodysky | 508/527 |
| 5,174,914 | A | | 12/1992 | Gutzmann | |
| 5,387,351 | A | | 2/1995 | Kumar et al. | |
| 5,851,969 | A | | 12/1998 | Andrew et al. | |
| 5,968,880 | A | | 10/1999 | Mathur et al. | |
| 6,245,725 | B1 | * | 6/2001 | Tanaka et al. | 508/365 |
| 2003/0134752 | A1 | | 7/2003 | Li et al. | |

FOREIGN PATENT DOCUMENTS

| JP | 56072089 U | 6/1981 |
| JP | 57042798 U | 3/1982 |
| JP | 60031598 A | 2/1985 |
| JP | 62101697 U | 6/1987 |
| JP | 2000230188 A | 8/2000 |

\* cited by examiner

*Primary Examiner* — Taiwo Oladapo
(74) *Attorney, Agent, or Firm* — Jason D. Voight

(57) ABSTRACT

A lubricant composition for ball joints exhibits excellent low friction not only at ordinary temperatures but also from higher to lower temperatures, and will not leak out of ball joints at higher temperatures. A ball joint has the lubricant composition sealed therein. The lubricant composition contains a base oil including a synthetic hydrocarbon oil, a thickener, and a fatty acid salt of a compound represented by the formula (1):

$$R^1-NH-R^2-NH_2 \qquad (1)$$

($R^1$: hydrocarbon group of C1 to C24; $R^2$: alkylene group of C2 to C4).

7 Claims, 1 Drawing Sheet

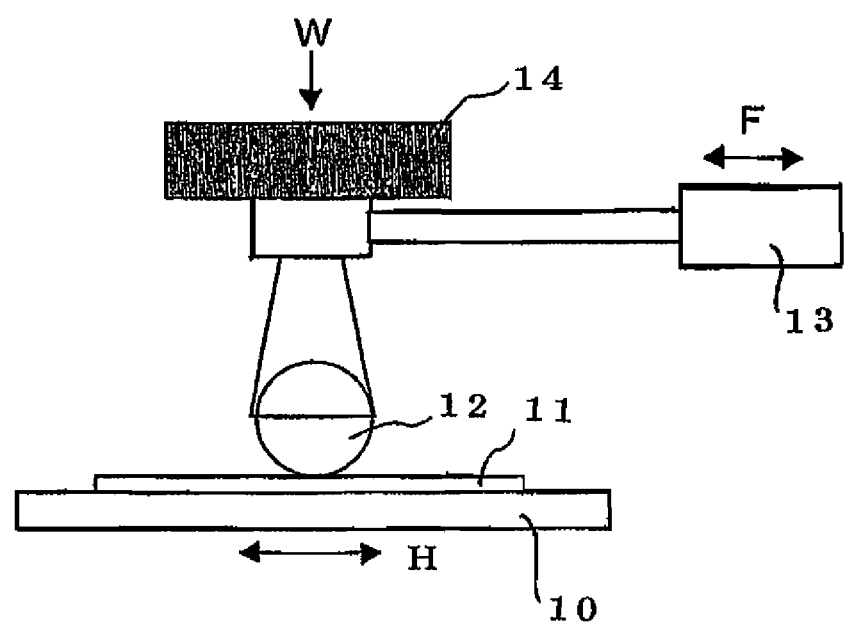

LUBRICANT COMPOSITION FOR BALL JOINT AND BALL JOINT

This application is a Continuation of U.S. Ser. No. 10/482,511, filed Dec. 31, 2003, which is a 371 National Phase application of PCT International Application No. PCT/JP02/06884, filed Jul. 8, 2002, which claims priority to Japanese Patent Application No. 2001-207722, filed Jul. 9, 2001. The contents of all three applications is hereby incorporated by reference in their entireties.

FIELD OF ART

The present invention relates to a lubricant composition for ball joints and a ball joint, more specifically a lubricant composition for ball joints having a metal ball stud and a synthetic resin seat for use in steering or suspension systems of automobiles, and a ball joint having such composition sealed therein.

BACKGROUND ART

In ball joints used in steering or suspension systems of automobiles, lubricants are sealed in. Lubricants known for such use include a composition containing Duomeen T dioleate as a base oil and a diamide compound (JP-62-54155-B), a composition containing a urea-base compound as a thickener and polyethylene wax, paraffin wax, microcrystalline wax, and/or a fatty acid amide wax (JP-2-194095-A), and a composition containing a base oil or a wax mixed with an amidoamine compound and a fatty acid salt for inhibiting fluttering during high speed driving (JP-6-240274-A).

These compositions exhibit excellent low friction at ordinary temperatures, which property is required for ball joints, but cannot maintain the property in higher and lower temperature ranges, causing increased friction.

With recent progress in automobile technologies, temperature in the engine compartment has been remarkably rising, which requires lubricants for ball joints to exhibit low friction in a higher temperature range. On the other hand, opportunity to use lubricants for ball joints in cold regions has also been increasing, which requires the lubricants to exhibit low friction in a lower temperature range as well.

SUMMARY OF THE INVENTION

It is therefore an object of the present invention to provide a lubricant composition for ball joints and a ball joint which composition has an excellent friction property in ball joints not only at ordinary temperatures but also from higher to lower temperatures, and which will not leak out of the ball joint even at higher temperatures.

According to the present invention, there is provided a lubricant composition for ball joints comprising:
  a base oil comprising a synthetic hydrocarbon oil;
  a thickener; and
  a fatty acid salt of a compound represented by the formula (1):

$$R^1\text{—NH—}R^2\text{—NH}_2 \quad (1)$$

wherein $R^1$ stands for a hydrocarbon group having 1 to 24 carbon atoms, and $R^2$ stands for an alkylene group having 2 to 4 carbon atoms.

According to the present invention, there is also provided a ball joint comprising a metal ball stud and a synthetic resin seat, wherein said ball joint has the above composition sealed therein.

BRIEF DESCRIPTION OF THE DRAWINGS

FIG. 1 is a schematic view of a Bowden friction apparatus used in the friction test performed in Examples and Comparative Examples.

PREFERRED EMBODIMENTS OF THE INVENTION

The present invention will now be discussed in detail.

In the composition of the present invention, the base oil is a synthetic hydrocarbon oil.

Examples of the synthetic hydrocarbon oil may include polyolefin, alkylbenzene, alkylnaphthalene, biphenyl, diphenylalkane, and di(alkylphenyl)alkane oils, with polyolefin oils being preferred.

The polyolefin oils may be of any kind, and those obtained by polymerizing one or more olefins having 2 to 12 carbon atoms are particularly preferred. More preferred polyolefins are those obtained by polymerizing one or more of ethylene, propylene, 1-butene, 2-butene, isobutene, and straight-chain terminal olefins having 5 to 12 carbon atoms (referred to as α-olefins hereinbelow).

Among these, copolymers of ethylene and propylene, copolymers of ethylene and α-olefin having 5 to 12 carbon atoms, polybutene, polyisobutene, and polymers of α-olefin having 5 to 12 carbon atoms are preferred, and copolymers of ethylene and α-olefin having 5 to 12 carbon atoms, and polymers of α-olefin having 5 to 12 carbon atoms are more preferred.

The above olefin polymers may be subjected to hydrotreatment before use as the base oil in the composition of the present invention.

The synthetic hydrocarbon oil may either be a single oil or a mixture of two or more different oils.

The base oil in the composition of the present invention may have any viscosity. The kinematic viscosity of the base oil at 100° C. is usually 1 to 600 mm$^2$/s, preferably 2 to 150 mm$^2$/s, and more preferably 5 to 50 mm$^2$/s.

In the composition of the present invention, the content of the base oil is not particularly limited. The minimum content is preferably 10 wt %, more preferably 20 wt %, and most preferably 40 wt % of the total amount of the composition, for the friction property at lower temperatures. The maximum content is preferably 87 wt %, more preferably 70 wt %, and most preferably 60 wt % of the total amount of the composition, for the friction property.

The base oil in the present composition may additionally contain base oils other than the synthetic hydrocarbon oil, for example, oxygen-containing synthetic oils such as ester, polyglycol, and polyphenyl ether oils, or mineral oils. However, the mineral oils may impair the performance at lower temperatures, and the ester oils may have adverse effects on the seat material. Thus the content of the other base oils is preferably not higher than 15 wt %, more preferably not higher than 10 wt %, and still more preferably not higher than 5 wt % of the total amount of the composition, and most preferably the other base oils are not contained.

The thickener in the composition of the present invention is not particularly limited, and may be of any kind. Examples of the thickener may include soap thickeners, urea thickeners, bentone, and silica gel. Among these, soap thickeners and urea thickeners are preferred for not damaging the seat materials of ball joints.

Examples of the soap thickeners may include sodium, potassium, aluminum, and lithium soaps, with lithium soaps

being preferred for their water resistance and thermal stability. The lithium soap may be, for example, lithium stearate or lithium 12-hydroxystearate.

Examples of the urea thickeners may include urea compounds, urea-urethane compounds, urethane compounds, and mixtures thereof.

Examples of the urea compounds, urea-urethane compounds, and urethane compounds may include diurea compounds, triurea compounds, tetraurea compounds, polyurea compounds (other than di-, tri-, and tetraurea compounds), urea-urethane compounds, diurethane compounds, and mixtures thereof, with diurea compounds, urea-urethane compounds, diurethane compounds, and mixtures thereof being preferred. Specifically, for example, one or a mixture of compounds represented by the formula (2) is preferred:

$$A\text{-CONH}—R^3—\text{NHCO}—B \quad (2)$$

wherein $R^3$ stands for a divalent hydrocarbon group, A and B may be the same or different and each stands for $—NHR^4$, $—NR^5R^6$, or $—OR^7$, with $R^4$ to $R^7$ being the same or different and each standing for a hydrocarbon residue having 6 to 20 carbon atoms.

In the formula (2), $R^3$ stands for a divalent hydrocarbon group having preferably 6 to 20, more preferably 6 to 15 carbon atoms. Examples of the divalent hydrocarbon group may include a straight or branched alkylene group, a straight or branched alkenylene group, a cycloalkylene group, and an aromatic group. $R^3$ may specifically be an ethylene group, a 2,2-dimethyl-4-methyl hexylene group, or groups of the following formulae, with the formulae (a) and (b) being particularly preferred.

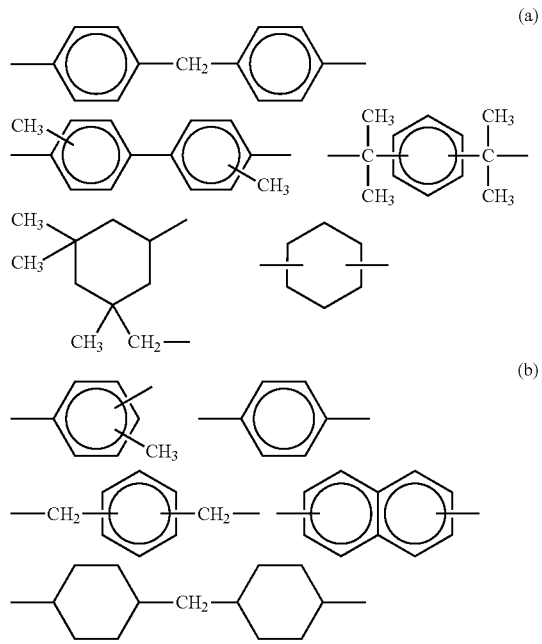

Examples of $R^4$ to $R^7$ may include a straight or branched alkyl group, a straight or branched alkenyl group, a cycloalkyl group, an alkylcycloalkyl group, an aryl group, an alkylaryl group, and an arylalkyl group. Specifically, a straight or branched alkyl group such as hexyl, heptyl, octyl, nonyl, decyl, undecyl, dodecyl, tridecyl, tetradecyl, pentadecyl, hexadecyl, heptadecyl, octadecyl, nonadecyl, and eicosyl groups; a straight or branched alkenyl group such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, and eicosenyl groups; a cyclohexyl group; an alkylcycloalkyl group such as methylcyclohexyl, dimethylcyclohexyl, ethylcyclohexyl, diethylcyclohexyl, propylcyclohexyl, isopropylcyclohexyl, 1-methyl-3-propylcyclohexyl, butylcyclohexyl, amylcyclohexyl, amylmethylcyclohexyl, hexylcyclohexyl, heptylcyclohexyl, octylcyclohexyl, nonylcyclohexyl, decylcyclohexyl, undecylcyclohexyl, dodecylcyclohexyl, tridecylcyclohexyl, and tetradecylcyclohexyl groups; an aryl group such as phenyl and naphthyl groups; an alkylaryl group such as tolyl, ethylphenyl, xylyl, propylphenyl, cumenyl, methylnaphthyl, ethylnaphthyl, dimethylnaphthyl, and propylnaphthyl groups; or an arylalkyl group such as benzyl, methylbenzyl, and ethylbenzyl groups, may be used. Among these, cyclohexyl, octadecyl, and tolyl groups are particularly preferred.

The above-mentioned diurea compound, urea-urethane compound, or diurethane compound may be prepared, for example, by reacting a diisocyanate represented by the formula $OCN—R^3—NCO$ and a compound represented by the formula $R^4NH_2$, $R^5R^6NH$, or $R^7OH$, or a mixture thereof, in a base oil at 10 to 200° C. Here, $R^3$ to $R^7$ are the same as those in the formula (2).

In the composition of the present invention, the content of the thickener is not particularly limited. The minimum content is preferably 3 wt %, more preferably 5 wt %, and most preferably 10 wt % of the total amount of the composition, for the friction performance at higher temperatures and for preventing leakage from the joint at higher temperatures. The maximum content is preferably 30 wt %, more preferably 25 wt %, and most preferably 20 wt % of the total amount of the composition, for the friction performance at lower temperatures and workability, in particular readiness for injection into the joint.

The composition of the present invention contains a fatty acid salt of a compound represented by the formula (1), in other words, a salt of a compound of the formula (1) and a fatty acid.

In the formula (1), $R^1$ stands for a hydrocarbon group having 1 to 24 carbon atoms, with an alkyl group having 12 to 18 carbon atoms, an alkenyl group having 12 to 18 carbon atoms, and an alkadienyl group having 12 to 18 carbon atoms being preferred. $R^1$ may be a residue derived from natural oils and fats, such as a hydrocarbon residue of beef tallow fatty acid.

$R^2$ in the formula (1) stands for an alkylene group having 2 to 4 carbon atoms, with an ethylene group being preferred for its availability.

The fatty acid may have 1 to 24 carbon atoms, may either be straight or branched, and saturated or unsaturated. As the fatty acid, oleic acid is particularly preferred for its availability and friction property.

The fatty acid salt may be prepared by reacting the compound of the formula (1) with a fatty acid at an arbitrary mixing ratio. The mixing ratio is arbitrary, and it is preferred to use 2 moles of a fatty acid to 1 mole of the compound of the formula (1).

In the composition of the present invention, the content of the fatty acid salt of the compound represented by the formula (1) is not particularly limited. The minimum content is preferably 10 wt %, more preferably 20 wt %, and most preferably 30 wt % of the total amount of the composition, for the friction performance at ordinary temperatures. The maximum content is preferably 87 wt %, more preferably 70 wt %, and most preferably 50 wt % of the total amount of the composition, for the friction performance at lower and higher temperatures.

The composition of the present invention may optionally contain a solid lubricant, an extreme pressure agent, an antioxidant, an oiliness agent, a rust inhibitor, a viscosity index improver, and/or waxes, as long as the properties of the composition are not impaired, or for further improving the performance.

Examples of the solid lubricant may include graphite, fluorinated carbon black, polytetrafluoroethylene, molybdenum disulfide, antimony sulfide, borates of alkali metals, and borates of alkaline earth metals.

Examples of the extreme pressure agent may include organozinc compounds such as zinc dialkyl dithiophosphate and zinc diaryl dithiophosphate; phosphates; and phosphites.

Examples of the antioxidant may include phenol compounds such as 2,6-di-t-butylphenol and 2,6-di-t-butyl-p-cresol; amine compounds such as dialkyl diphenylamine, phenyl-α-naphthylamine, and p-alkylphenyl-α-naphthyl amine; sulfur compounds; and phenothiazine compounds.

Examples of the oiliness agent may include amines such as laurylamine, myristylamine, palmitylamine, stearylamine, and oleylamine; higher alcohols such as lauryl alcohol, myristyl alcohol, palmityl alcohol, stearyl alcohol, and oleyl alcohol; higher fatty acids such as lauric acid, myristic acid, palmitic acid, stearic acid, and oleic acid; fatty acid esters such as methyl laurate, methyl myristate, methyl palmitate, methyl stearate, and methyl oleate; amides such as laurylamide, myristylamide, palmitylamide, stearylamide, and oleylamide; and oils and fats.

Examples of the rust inhibitor may include metal soaps; partial esters of a polyhydric alcohol such as sorbitan fatty acid ester; amines; phosphoric acid; and phosphates.

Examples of the viscosity index improver may include polymethacrylate, polyisobutylene, and polystyrene.

Examples of the waxes may include various waxes such as natural waxes, mineral oil waxes, and synthetic waxes, more specifically, montan wax, carnauba wax, amide compounds of a higher fatty acid, paraffin wax, microcrystalline wax, polyolefin wax, and ester wax.

Since the composition of the present invention contains a synthetic hydrocarbon oil as a base oil, a thickener, and a particular fatty acid salt, the composition, when used in a ball joint, exhibits excellent low friction not only at ordinary temperatures, which is characteristic of conventional greases for ball joints, but also at higher and lower temperatures. Thus the present composition is useful for various ball joints.

The ball joint of the present invention has a metal ball stud and a synthetic resin seat, and has the lubricant composition of the present invention sealed therein. The structure of the ball joint is not particularly limited, and may be, for example, those of conventional ball joints used in steering or suspension systems of automobiles.

The lubricant composition of the present invention may be sealed in the ball joint by any conventional manners.

EXAMPLES

The present invention will now be explained with reference to Examples and Comparative Examples, but the present invention is not limited thereto.

Examples 1-7 and Comparative Examples 1-5

A composition for each Example and Comparative Example as shown in Table 1 was prepared by first melting the base oil and the thickener under heating, adding and dissolving the other additives, and passing the resulting mixture through a roll mill. The components of the compositions are shown below. The unit for the amounts of the components shown in Table 1 is weight percent.

Base Oils

Poly-α-olefin oil (kinematic viscosity at 100° C.: 8 mm$^2$/s)

Oligomer of ethylene-α-olefin (kinematic viscosity at 100° C.: 2000 mm$^2$/s)

Mineral oil (kinematic viscosity at 100° C.: 10 mm$^2$/s)

Thickeners

Urea thickener: diurea compound

Lithium soap: lithium stearate

Additives

Duomeen T dioleate: salt of compound of the formula (1) wherein $R^1$ is a hydrocarbon group of beef tallow fatty acid and $R^2$ is an ethylene group, and oleic acid (1:2 in molar ratio)

Diamide compound: diamide compound of ethylene diamine and oleic acid

Other Additives: mixture of the following additives (contents are based on the total amount of the composition) 1 wt % of antioxidant 1 (YOSHINOX BHT (trade name), manufactured by YOSHITOMI FINE CHEMICALS, LTD.), 0.5 wt % of antioxidant 2 (Irganox L101 (trade name), manufactured by CIBA SPECIALTY CHEMICALS, CORP.), 0.45 wt % of rust inhibitor (Peretex OS100 (trade name), manufactured by MIYOSHI OIL & FAT CO., LTD.), and 0.05 wt % of metal deactivator (Irgamet (trade name) 39, manufactured by CIBA SPECIALTY CHEMICALS, CORP.)

Next, the lubricant compositions prepared in Examples 1 to 5 and Comparative Examples 1 to 3, and commercially available greases for ball joints (Comparative Examples 4 and 5) were subjected to measurements of the coefficient of friction and the dropping point in accordance with the methods explained below. The results are shown in Table 1.

Method for Testing Friction Property: Bowden Test

The friction property was tested using a commercially available Bowden friction apparatus, which is shown schematically in FIG. 1. This apparatus has a sliding material 11 fixed on a sample stand 10 capable of reciprocating horizontally, and a steel ball 12 fixed in a holder and capable of pressing onto the sliding material 11 as shown in FIG. 1. The frictional force is measured with a strain gauge load cell 13 connected to the holder for the steel ball 12, and recorded with a recorder, while the sample stand 10 having the sliding material 11 fixed thereon is reciprocated horizontally in the direction of arrow H. The load may be adjusted by selecting a weight 14, and the average moving speed of the sample stand 10 may be adjusted steplessly. The sample was fed by applying 0.5 g of the sample oil to the sliding material 11 before the test.

The coefficient of friction at the initial stage of sliding was measured under the test conditions such that the horizontal moving speed was 3.6 mm/s and the load was 4.9 N, a commercially available 5/32 inch precision steel ball for ball bearings was used as the steel ball 12, and the sliding material 11 was made of a polyacetal resin.

Performance at Higher Temperatures: Propping Point Test

The dropping point test was conducted using a tester prescribed in JIS K2220 5.4.2 under the conditions prescribed in 5.4.4.

TABLE 1

|  |  | Example | | | | | | | Comparative Example | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| Base oil | Poly-α-olefin oil | 18.0 | 13.5 | 27.0 | 18.0 | 18.0 | 40.0 | 18.0 | — | — | — | Commercial Product A Li-base + mineral oil | Commercial Product B Li-base + polybutene |
|  | Oligomer of ethylene α-olefin | 22.0 | 16.5 | 33.0 | 22.0 | 22.0 | — | 22.0 |  |  |  |  |  |
|  | Mineral oil |  |  |  | — |  |  |  |  | 45.0 | 45.0 |  |  |
|  | Viscosity (mm²/sec) (100° C.) | 75 | 75 | 75 | 75 | 75 | 8 | 75 | — | 10 | 10 |  |  |
| Thickener | Lithium soap | 15.0 | 15.0 | 15.0 | 10.0 | 10.0 | 20.0 |  | — |  | 13.0 |  |  |
|  | Urea Thickener |  |  | — |  |  |  | 10.0 |  | — |  |  |  |
| Additive | Duomeen T dioleate | 43.0 | 53.0 | 23.0 | 43.0 | 43.0 | 38.0 | 48.0 | 85.0 | 40.0 | 40.0 |  |  |
|  | Microcrystalline wax |  |  |  | 5.0 |  | — |  |  |  |  |  |  |
|  | Diamide compound |  | — |  |  | 5.0 |  |  | 13.0 | 13.0 | — |  |  |
|  | Other additives |  |  |  |  | 2.0 |  |  |  |  |  |  |  |
| Coefficient of friction | −20° C. | 0.063 | 0.067 | 0.059 | 0.065 | 0.065 | 0.061 | 0.063 | 1.5≦ | 1.5≦ | 1.5≦ | 1.5≦ | 1.5≦ |
|  | 25° C. | 0.043 | 0.042 | 0.046 | 0.043 | 0.043 | 0.044 | 0.042 | 0.041 | 0.043 | 0.044 | 0.075 | 0.082 |
|  | 70° C. | 0.046 | 0.051 | 0.047 | 0.047 | 0.046 | 0.046 | 0.043 | 0.042 | 0.046 | 0.044 | 0.075 | 0.082 |
| Dropping point ° C. |  | 130 | 115 | 160 | 120 | 120 | 138 | 160 | 60 | 60 | 120 | 200 | 205 |

From Table 1, it is understood that the compositions of Examples 1 to 7 according to the present invention had low coefficients of friction not only at the ordinary temperature, but also at the high and low temperatures, and also had proper dropping points. On the other hand, the composition without a base oil and a thickener (Comparative Example 1), and the composition containing a mineral oil as a base oil and not containing a thickener (Comparative Example 2) exhibited large coefficients of friction at the low temperature and low dropping points. Further, the composition containing a mineral oil as a base oil (Comparative Example 3) exhibited a large coefficient of friction at the low temperature. It is also understood that the commercial products in Comparative Examples 4 and 5 exhibited higher coefficients of friction not only at the ordinary temperature, but also at the high and low temperatures, compared to the composition of the present invention.

What is claimed is:

1. A ball joint comprising a metal ball stud and a synthetic resin seat, wherein said ball joint has a composition sealed therein, wherein said lubricant composition comprises:
    a 20 to 70 wt % base oil comprising a synthetic hydrocarbon oil selected from the group consisting of poly-α-olefin oil, oligomer of ethylene-α-olefin, and mixtures thereof;
    a 5 to 25 wt % thickener; and
    a 20 to 70 wt % fatty acid salt of a compound represented by the formula (1):

    R¹—NH—R²—NH₂     (1)

wherein R¹ is a hydrocarbon group having 1 to 24 carbon atoms, and R² is an alkylene group having 2 to 4 carbon atoms; and
    wherein a coefficient of friction of said lubricant composition is 0.059 to 0.067 at −20° C.

2. The ball joint of claim 1, wherein said lubricant composition further comprises an additive selected from the group consisting of a solid lubricant, an extreme pressure agent, an antioxidant, an oiliness agent, a rust inhibitor, a viscosity index improver, waxes, a metal deactivator, and mixtures thereof.

3. The ball joint of claim 1, wherein said lubricant composition comprises 30 to 60 wt % of said base oil.

4. The ball joint of claim 1, wherein said lubricant composition comprises 10 to 20 wt % of said thickener.

5. The ball joint of claim 1, wherein said thickener is selected from the group consisting of a urea thickener, a lithium soap, and mixtures thereof.

6. The ball joint of claim 1, wherein said lubricant composition comprises 23 to 53 wt % of said fatty acid salt of the compound represented by the formula (1).

7. The ball joint of claim 1, wherein, in the formula (1), R¹ is a hydrocarbon group of beef tallow fatty acid, and R² is an ethylene group.

* * * * *